United States Patent [19]

Satran et al.

[11] Patent Number: 5,718,540
[45] Date of Patent: Feb. 17, 1998

[54] CUTTING INSERT HAVING CUTTING EDGES FORMED WITH SLOPING LATERAL PORTIONS

[75] Inventors: Amir Satran, Kfar Vradim; Dina Agranovsky, Nahariya, both of Israel

[73] Assignee: Iscar, Ltd., Migdal Tefen, Israel

[21] Appl. No.: 620,231

[22] Filed: Mar. 22, 1996

[30] Foreign Application Priority Data

Mar. 24, 1995 [IL] Israel .................... 113122

[51] Int. Cl.$^6$ .................... B32C 5/20
[52] U.S. Cl. .................... 407/42; 407/113
[58] Field of Search .................... 407/42, 113, 114, 407/115

[56] References Cited

U.S. PATENT DOCUMENTS

| | | | |
|---|---|---|---|
| 4,632,607 | 12/1986 | Pantzar | 407/113 |
| 5,056,963 | 10/1991 | Kameno et al. | |
| 5,199,827 | 4/1993 | Pantzar | 407/42 |
| 5,382,118 | 1/1995 | Satran et al. | 407/42 |
| 5,388,932 | 2/1995 | De Roche et al. | 407/113 |
| 5,454,671 | 10/1995 | Qvarth | 407/42 |
| 5,456,557 | 10/1995 | Bernadic et al. | 407/114 |

*Primary Examiner*—Daniel W. Howell
*Assistant Examiner*—Kenneth J. Hansen
*Attorney, Agent, or Firm*—Pennie & Edmonds, LLP

[57] ABSTRACT

An exchangeable cutting insert adapted for mounting in a cutter tool body for use, in particular, in combined face and periphery milling operations. The cutting insert is a substantially prismoidal body having a planar base and an upper surface with rake portions merging with side flanks of the insert at least at two cutting edges defining therebetween an insert corner. The insert corner has a bisector plane perpendicular to the base of the insert. Each cutting edge comprises a central portion and first and second lateral portions sloping with respect to the base of the insert, the corner being associated with adjoining first and second lateral portions of the adjacent cutting edges. The central portions of the cutting edges define therebetween a first plane parallel to the base and the adjoining first and second lateral portions have equal lengths and define therebetween a second plane inclined with respect to the base plane and perpendicular to the bisector plane so that the insert corner and the cutting edges have a geometry of a mirror symmetry with respect to the bisector plane. Each cutting edge is capable of operating, when the insert is mounted in the tool, as a peripheral cutting edge having a cutting length deemed by the first lateral portion and the central portion thereof, and as a frontal cutting edge having a cutting length defined by the second lateral portion thereof.

31 Claims, 6 Drawing Sheets

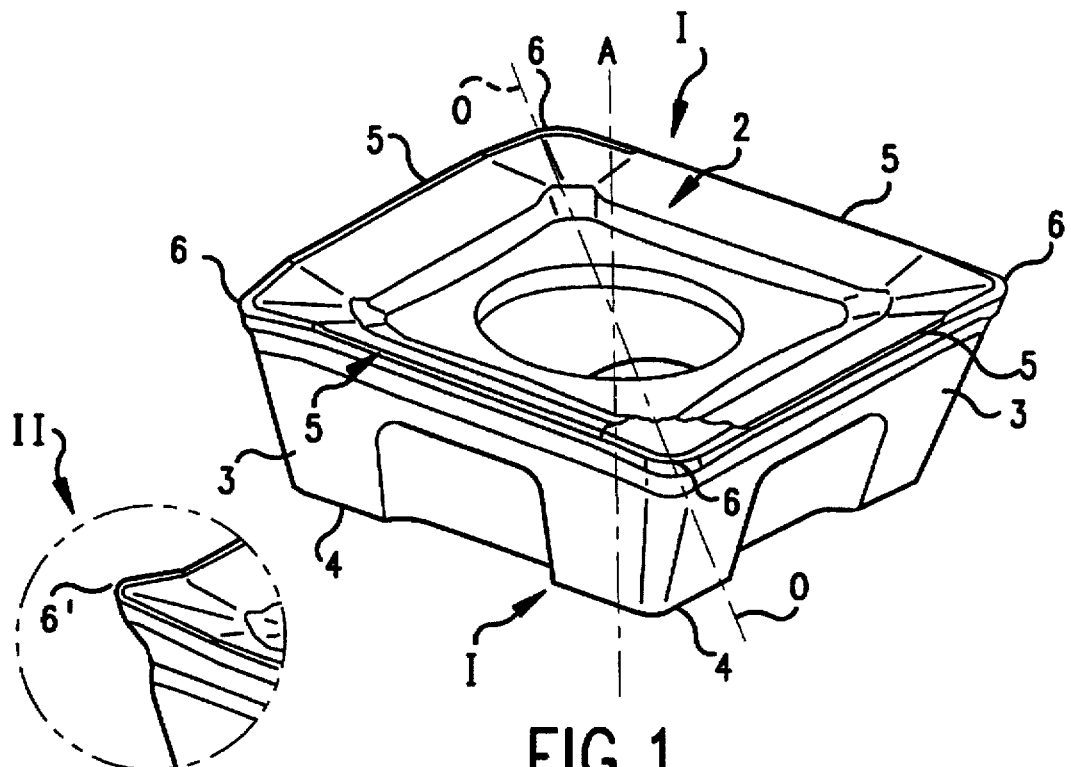
FIG. 1
FIG. 1a
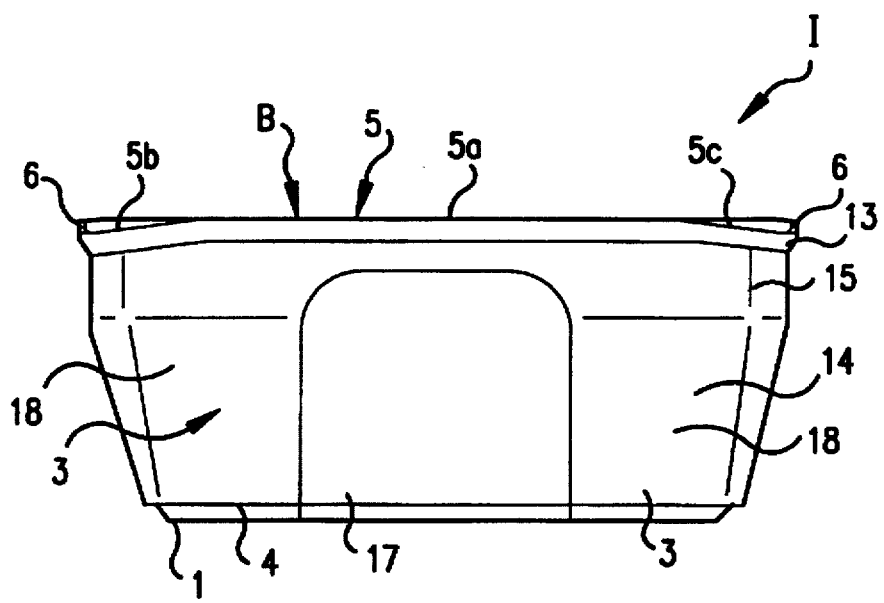
FIG. 2

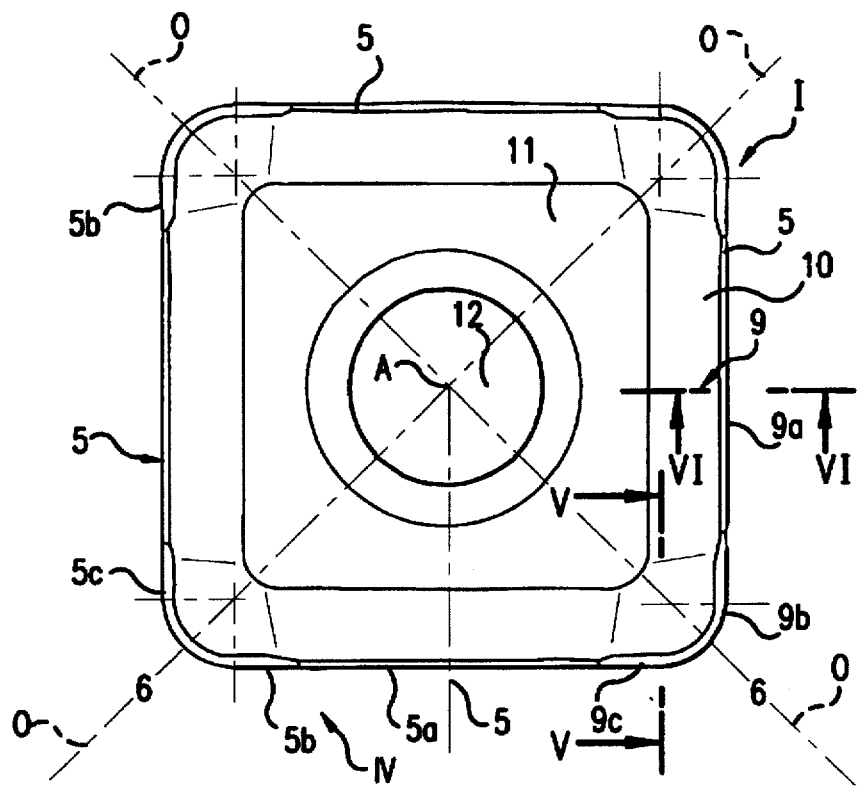
FIG.3
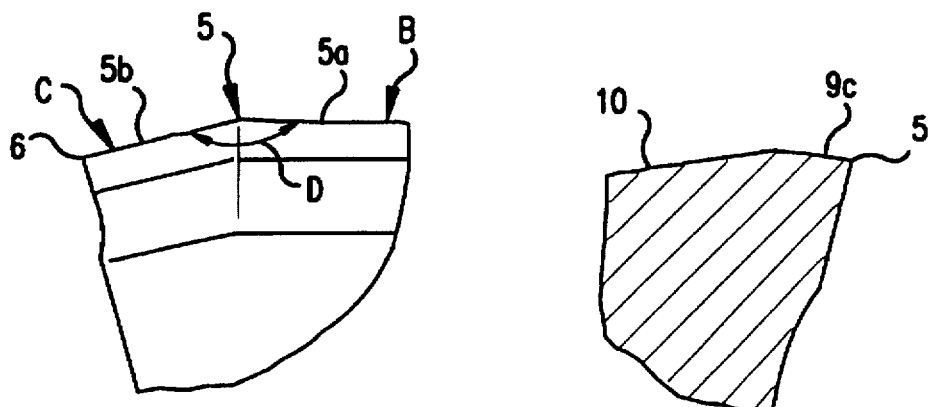
FIG.4
FIG.5
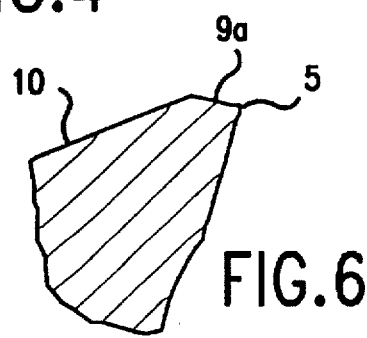
FIG.6

CUTTING INSERT HAVING CUTTING EDGES FORMED WITH SLOPING LATERAL PORTIONS

FIELD OF THE INVENTION

The present invention relates to a cutting insert to be used in a cutting tool for chip removing operations such as, for example, milling, drilling and turning and, in particular, for a combined face and periphery milling specifically required for machining of shoulders, particularly, right-angled shoulders, slots and the like.

BACKGROUND OF THE INVENTION

With a cutting insert mounted in a milling cutter for use in the above specified cutting operations, the cutting action is usually performed by the insert peripheral cutting edge disposed on a periphery of the milling cutter substantially co-directionally with a rotary axis thereof and by an adjoining portion of the insert frontal cutting edge disposed at a front face of the cutter generally transversely to the rotary axis, which portion is often called a "wiper" portion and is prepared so as to generate a flat base surface of a machined workpiece with a high surface quality.

As it is clearly desirable, from the economical point of view, that a cutting insert is provided with a maximum number of cutting edges which can be readily indexed into position as and when required, there have been designed inserts of a substantially square shape and four cutting edges each capable of operating as both a peripheral and a frontal cutting edge. Such inserts have a 90° symmetry rotational around the insert central axis in a predetermined, either clockwise or counterclockwise direction, whereby the insert cutting edges can be indexed for use in a respectively handed cutter tool.

Each cutting edge of the cutting insert of the above kind usually comprises a main portion and at least one secondary portion such that when, the cutting edge operates as a peripheral cutting edge, its main portion is used as a major cutting edge to mill an uprising wall of a machined shoulder and, when the cutting edge operates as a frontal cutting edge, its secondary portion functions as a wiper to wipe a base of the machined shoulder.

For such inserts to be capable of machining right-angled shoulders, there have to be ensured that an effective angle of the cutting corner is substantially 90°. On the other hand, there has to always provided a sufficient; end cutting clearance angle between an inactive portion of the frontal cutting edge and the base of the machined shoulder and there has to be ensured that a deviation from straightness of the upright wall of the shoulder machined by the peripheral cutting edge does not exceed an acceptable value.

Cutting inserts of this type, which generally satisfy the above restrictions, are disclosed, for example, in U.S. Pat. No. 4,632,607, U.S. Pat. No. 5,199,827 and U.S. Pat. No. 5,382,118.

In U.S. Pat. No. 4,632,607, a cutting insert is of a generally square shape and has four identical cutting edges. Each cutting edge consists of main and secondary successive portions, the secondary portion of each cutting edge, as seen in a plan view of the insert, protruding with respect to the main portion of which it forms an extension. The insert has four identical corners, each adjoining main and secondary portions of two adjacent cutting edges, which portions define therebetween an angle of 90°. During a cutting operation, the main portion of a peripherally disposed cutting edge is used as a major cutting edge for a peripheral cutting and the associated secondary portion of a frontal cutting edge functions as a wiper.

U.S. Pat. No. 5,199,827 discloses a cutting insert having a generally square shape and four identical cutting edges. Each cutting edge comprises a main edge portion and a secondary edge portion, the main edge portion extending slightly angularly with respect to the associated secondary edge portion. The insert has identical corners each of which joins main and secondary edge portions of adjacent cutting edges, a real angle therebetween being slightly greater than 90°. The insert is mounted in a cutter body so as to obtain in a workpiece an effective angle of 90°.

U.S. Pat. No. 5,382,118 discloses a cutting insert having a substantially square shape and four identical cutting edges each comprising a central cutting edge portion and first and second lateral cutting edge portions disposed at both sides of the central cutting edge portion. The insert has four identical corners, each corner joining first and second lateral cutting portions of adjacent cutting edges. Each of the three cutting edge portions of each cutting edge is inclined with respect to the base in a specific manner so that the cutting edge, as seen in a front view, has a convex-concave shape. During a cutting operation, the first lateral portion and the central portion of a peripheral cutting edge define a major cutting edge and machine an uprising wall of a workpiece shoulder, while the second lateral portion of a frontal cutting edge functions as a wiper and machines a base of the shoulder.

It should be understood that, in all cutting inserts described above, insert corners are asymmetrical with respect to their bisector lines, in consequence with which the cutting inserts can be provided either as right-handed or as left-handed to be used with respectively handed cutter bodies.

It is the object of the present invention to provide a new cutting insert suitable for mounting on both right-handed and left-handed cutter bodies, in which an insert corner has a mirror symmetry with respect to a bisector line thereof.

SUMMARY OF THE INVENTION

In accordance with the present invention there is provided an exchangeable cutting insert adapted for mounting in a cutter tool body, said cutting insert being a substantially prismoidal body having a planar base and, an upper surface with rake portions merging with side flanks of the insert at least at two cutting edges defining therebetween an insert corner, the insert corner having a bisector plane perpendicular to the base of the insert;

each cutting edge comprising a central portion and first and second lateral portions sloping with respect to said base of the insert, said corner being associated with adjoining first and second lateral portions of the adjacent cutting edges;

each cutting edge being capable of operating, when the insert is mounted in the tool, as a peripheral cutting edge having a cutting length defined by the first lateral portion and the central portion thereof, and as a frontal cutting edge directed transversely to an adjacent peripheral cutting edge and having a cutting length defined by the second lateral portion thereof;

characterised in that said central portions of the cutting edges define therebetween a first plane parallel to said base and said adjoining first and second lateral portions have equal lengths and define therebetween a second plane inclined with respect to said base plane and perpendicular to said bisector plane so that said insert corner and said cutting edges have a geometry of a mirror symmetry with respect to said bisector plane.

The cutting insert according to the present invention is preferably adapted for mounting in a rotary cutting tool in such a manner that said second lateral portion of the insert front cutting edge is disposed in a plane normal to a rotary axis of the tool thereby serving as a wiper, and said central portion of the insert peripheral cutting edge is oriented so that, during rotation of the insert around the rotary axis, it constitutes a generator which sweeps a substantially cylindrical envelope.

In one embodiment of the present invention, said second plane defined by said adjoining first and second lateral portions of the cutting edges slopes towards the insert base in the direction of the respective insert corner, when viewed from the center of the insert. In another embodiment of the present invention, said second plane slopes in an opposite sense, i.e. away from the insert base.

In both embodiments of the present invention, the insert may have any required number of insert corners. When however, the insert is to be used in machining of right-angled shoulders or the like, the insert has a basic square shape with four cutting edges and four corners and 90° rotational symmetry, both clockwise and counterclockwise, around a central axis of the insert.

BRIEF DESCRIPTION OF THE DRAWINGS

For a better understanding of the present invention and to show, by way of example only, how the same may be carried out in practice, reference will be made to the accompanying drawings, in which FIG. 1 is a respective view of a cutting insert according to a first embodiment of the present invention;

FIG. 1a is a view illustrating a corner portion of a cutting insert similar to that of the insert shown in FIG. 1, according to a second embodiment of the present invention;

FIG. 2 is a side elevation of the cutting insert shown in FIG. 1;

FIG. 3 is a plan view of the cutting insert shown in FIG. 1;

FIG. 4 is view orthogonal to a bisector plane O—O of a corner portion of the cutting insert shown in FIG. 3;

FIG. 5 and 6 are cross-sectional views along the respective lines V—V, and VI—VI of the cutting insert shown in FIG. 3;

FIG. 7 is a top view of a cutting insert according the second embodiment of the present invent illustrated in FIG. 1a;

DESCRIPTION OF PREFERRED EMBODIMENTS

Figure 9:
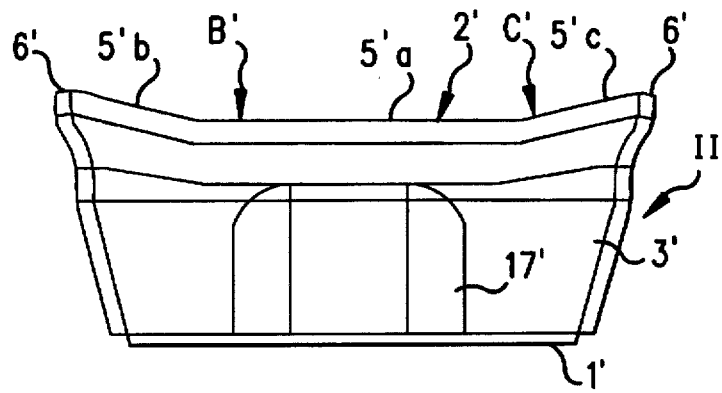
FIG. 9 is a side elevation of the cutting insert shown in FIG. 7.

Described hereinbelow are two examples of indexable cutting inserts for use in a milling cutter tool, according to the present invention. The examples show two different embodiments of the cutting insert of the present invention, which are generally, similar in shape and in the manner of mounting of the insert in the cutter body and which differ mainly in the geometry of their insert corners. Thus, FIG. 1 illustrates a cutting insert I according to the first embodiment of the present invention, which is most suitable for the machining of relatively hard materials and FIG. 1a illustrates a corner portion of a cutting insert II according to the second embodiment of the present invention, which is more suitable for materials requiring higher positive shear angles.

As seen in FIG. 1 and specifically shown in FIGS. 2 and 3, the cutting insert I is a prismoidal body of a basic square shape. The insert is of a positive type and has a planar base 1, an upper surface 2 and four side flanks 3 (only two being seen) extending upwardly and outwardly from respective side edges 4 of the base 1. The insert has four cutting edges 5 formed at an intersection of the side flanks 3 with the upper surface 2 and defining therebetween insert corners 6 which are preferably rounded, as shown in FIG. 3, but may also have facets. Each insert corner as well as cutting edges associated therewith are designed with a mirror symmetry with respect to a bisector plane O—O passing through the bisector line of the corner perpendicularly to the base 1 of the insert. Thus, the insert has also a 90° rotational symmetry, clockwise and counterclockwise, around a central axis A thereof so that the four cutting edges 5 and insert corners 6 are identical and can be equally used in cutting operations for both right-handed and left-handed applications.

With reference to FIG. 2, each cutting edge 5 of the cutting insert I comprises a central portion 5a extending over a greater part of the length of the cutting edge 5 and first and second lateral portions 5b and 5c having equal lengths anal extending in opposite directions from the central cutting portion 5a towards respective insert corners 6. Each insert corner 6 is associated with adjoining first and second lateral portions 5b and 5c of the adjacent cutting edges 5. The length of each lateral cutting edge portion including the adjacent corner is relatively small. Thus, the length of the central cutting portion is generally about 40–60% of the entire length of the cutting edge which can be in a broad range, e.g in the range of 8+25 mm. For such lengths of edge, each lateral cutting portion is preferably about 2.4 mm.

With reference to FIGS. 2 and 4, it can be seen that the central cutting edge portions 5a of all the cutting edges 5 are parallel to the base 1 and lie in a common plane B. The lateral cutting edge portions 5b and 5c of each cutting edge 5 slope downwardly towards the base 1 in a such a manner that an imaginary plane C defined between each pair of the adjoining first and second lateral cutting edge portions 5b and 5c is directed angularly with respect to the plane B and perpendicularly to the bisector plane O—O. As seen in FIG. 4, the plane C defines with the plane B an internal obtuse angle D which is, preferably, slightly less than 180°, e.g. about 1760°. By virtue of such a design, a complete geometrical symmetry of the adjoining first and second lateral portions of the adjacent cutting edges with respect to the bisector plane is achieved. In addition, the insert corner 6 is strengthened.

It should be understood that, for the purposes of the illustration, the relative angular inclinations of the cutting edge portions are shown in the drawings exaggerated as compared with those obtaining with the real insert. In practice, however, each cutting edge 5 is seen in a plan projection of the insert such as FIG. 3, as a substantially straight line.

As seen in FIG. 3, the upper surface 2 of the insert comprises, adjacent each cutting edge 5, a land surface 9 and a component rake surface 10 extending downwardly from the land surface 9 in the direction of the base 1 towards a central planar surface 11 thereof which is parallel to the base 1. As seen in FIGS. 3, 5 and 6, portions 9b and 9c of the land surface 9 adjacent the respective first and second lateral portions 5b and 5c have a width larger and an angle of inclination with respect to the base 1 smaller than a portion 9a of the land adjacent the central portion 5a of the cutting edge, whereby the area of the cutting edge adjacent the insert corner is strengthened. Formed in the central surface 11 and extending through the insert is a throughgoing bore 12 adapted to receive therein a suitable clamping screw for mounting the insert in the milling cutter.

As seen in FIG. 2, each side flank 3 of the insert comprises an upper, relief flank surface 13, a lower, insert positioning surface 14 and an intermediate portion 15 therebetween. In the preferred embodiment of the present invention, the insert side flank is preferably formed with a central recessed portion 17 extending substantially from the relief flank surface 13 downwardly towards the base 1 and bounded on either side by a pair of flat sections 18. The recessed portion 17 has a design described in a co-pending Israel Patent Application No. 113121, enabling the use of the recess, when the insert is mounted in the cutting tool, for support of the insert in an axial direction of the tool.

Figure 8:
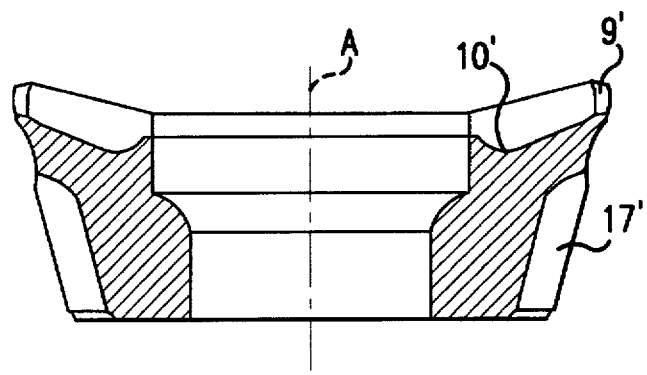
FIG. 8 is cross-sectional view along the line VIII—VIII of the cutting insert shown in FIG. 7.
Figure 7:
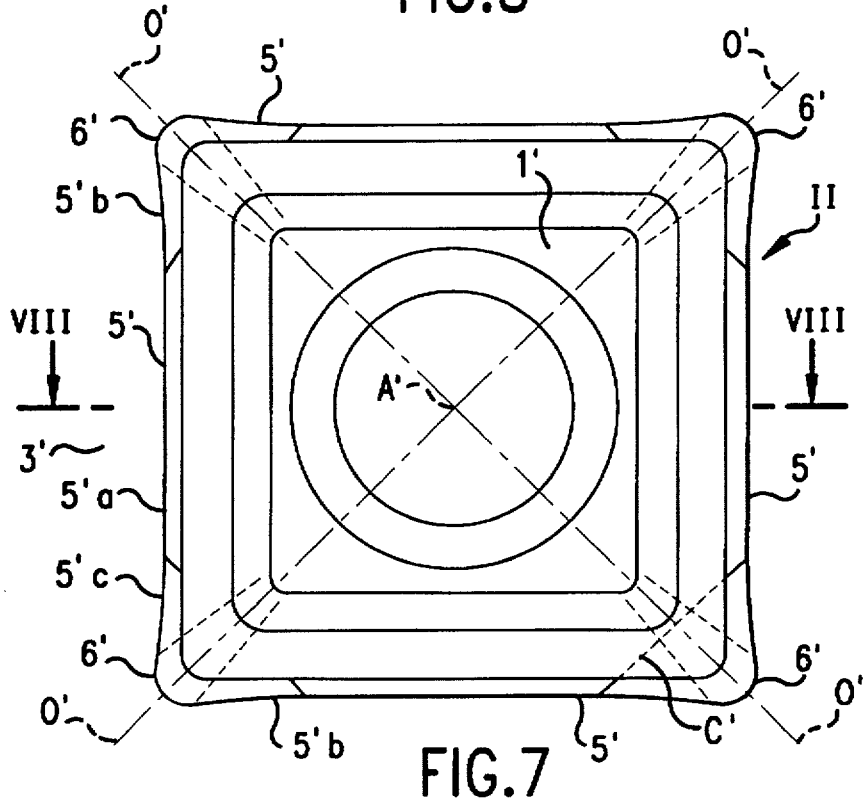

FIGS. 7 to 9 show the second embodiment of a cutting insert, according to the present invention, a corner portion of which is illustrated in FIG. 1a. As seen, the cutting insert II is a prismoidal body of a basic square shape and has a planar base 1', an upper surface 2' and four side flanks 3' intersecting the upper surface 2' at four identical cutting edges 5' defining therebetween four identical insert corners 6'. Each insert corner as well as the cutting edges associated therewith are designed with a mirror symmetry with respect to a bisector plane O'—O' passing through a bisector line of the corner perpendicularly to the base 1' of the insert. Thus, the insert has also a 90° rotational symmetry, clockwise and counterclockwise, around a central axis A' thereof so that the four cutting edges 5' and insert corners 6' are identical and can be equally used in cutting operation for both right-handed and left-handed applications.

Similarly to the cutting edge 5 of The insert I of the first embodiment of the present invention, the cutting edge 5' comprises a central portion 5'a extending over a greater part of the length of the cutting edge 5 and first and second lateral portions 5'b and 5'c having equal lengths and extending in the opposite directions from the central portion 5'a towards respective cutting corners 6'. Each cutting edge 6' is associated with first and second lateral portions 5'b and 5'c of two adjacent cutting edges 5'.

The central cutting edge portions 5'a of all the cutting edges 5' lie in a common plane B' parallel to the base 1'. The lateral cutting edge portions 5'b and 5'c slope upwardly from the base 1' so that an imaginary plane C' defined between each pair of the adjoining first and second lateral cutting edge portions 5'b and 5'c is directed angularly with respect to the plane B' forming therewith an internal angle which is preferably slightly greater than 180°, e.g. 185°. By virtue of this design, a more positive geometry of a chip rake surface 10' of the insert is achieved which is specifically important for cutting materials requiring larger positive rake angles.

As seen in FIGS. 8 and 9, upper and side relief flank surfaces of the cutting insert II are generally similar to those of the cutting insert I. Thus, the insert upper surface 2' comprises, adjacent each cutting edge 5', a land surface 9' and a component rake surface 10' extending downwardly from the land surface 9 in the direction of the base 1'. The side relief flank surfaces 3' are of a positive design and preferably have recesses 17'.

Figure 10:
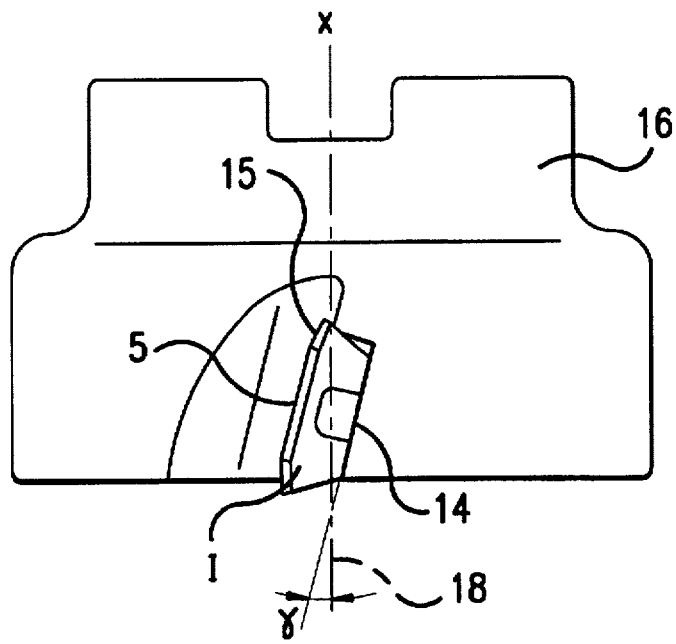
FIG. 10 is a schematic side view of a milling cutter employing a cutting insert according to the first embodiment thereof shown in FIGS. 1 and 2 to 6.
Figure 11:
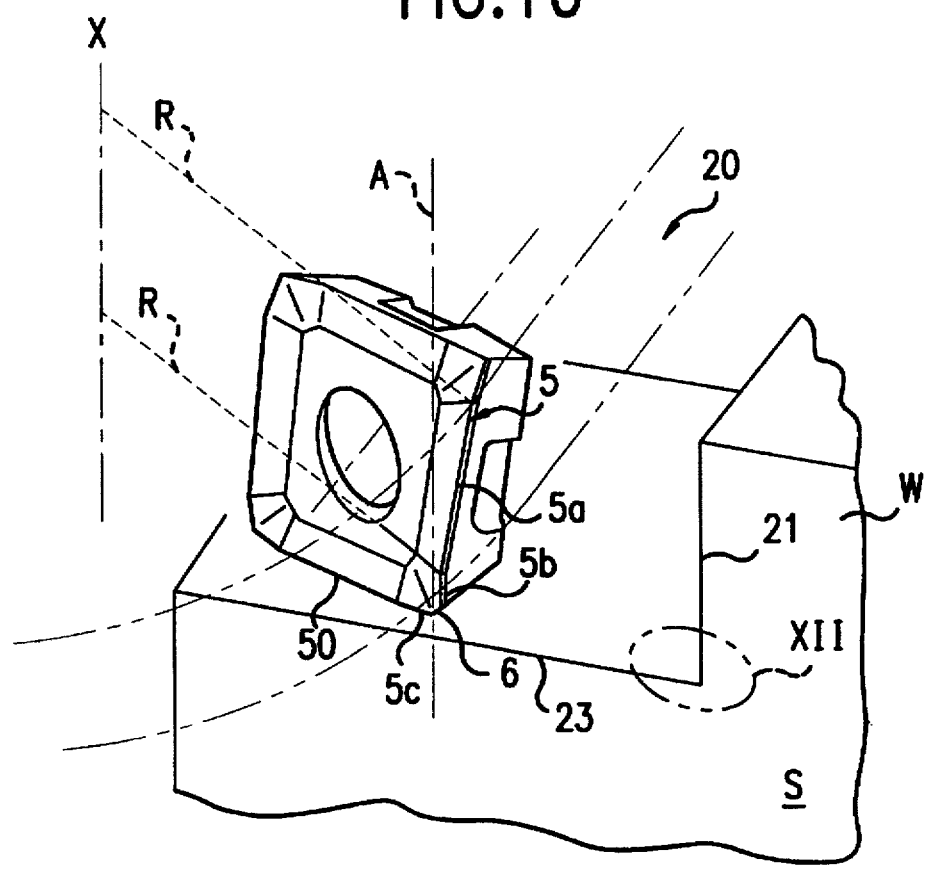
FIG. 11 is schematic perspective view of the cutting insert as shown in FIG. 10 and of a shoulder machined in a workpiece by a milling cutter using this insert.
Figure 12:
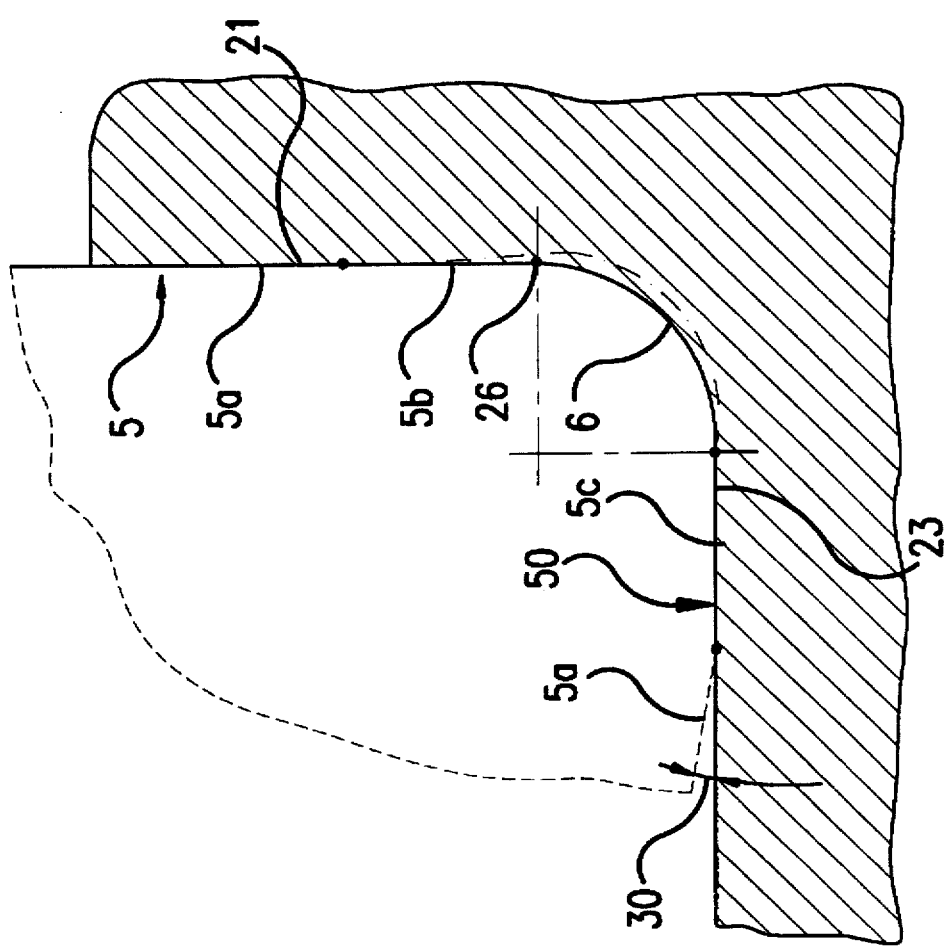
FIG. 12 is a view on an enlarged scale of a detail XII of the machined shoulder shown, in FIG. 11 with a contour of the cutting insert imposed thereon.

Reference will now be made to FIGS. 10 to 12 of the drawings, which illustrate a disposition of the cutting insert I in accordance with the first embodiment of the present invention described above, in a milling cutter during milling of a workpiece W.

FIG. 10 illustrates the cutting insert I mounted on a seating plane 14 of a peripheral pocket 15 of a milling cutter body 16. The cutter body has a rotary axis X and a radial reference plane 18 passing through the rotary axis X of the cutter body below the cutting edge 5 of the insert. The seating plane 14 is inclined with respect to the radial reference plane 18 at a positive axial inclination angle γ which is the true angle therebetween when they are seen in the orthogonal projection. It should be understood that such inclination and the location of the insert cutting edges above the reference plane define the: insert effective axial and radial cutting rake angles with respect to the tool.

As seen in FIG. 11, in order to machine a right-angled shoulder S in the workpiece W, the cutting insert I is mounted so that its cutting edge 5 is oriented generally co-directionally with respect to the rotary axis X and operates as a peripheral cutting edge and a cutting edge 50 disposed generally transversely to the rotary axis X operates as frontal cutting edge. The insert is slightly rotated on the seating plane 14 clockwise about the insert central axis A so that the second lateral cutting edge portion 5c of the frontal cutting edge 50 is positioned in a pine normal to the rotary axis X serving thereby as a wiper for wiping a base 23 of the shoulder S. Furthermore, as seen in FIG. 12, by virtue of the totaled position of the insert, there is ensured a required clearance 30 between the inactive portion 5a of the front cutting edge 50 and the base 23 of the machined shoulder S. The central portion 5a merges continuously with the first lateral portion 5b, forming peripheral cutting edge 5. Together, they constitute a major cutting edge of the insert, the central portion 5a being oriented so that, during rotation of the insert around the axis X, it constitutes a generator which sweeps an approximately cylindrical envelope 20 of a radius R to accordingly mill an upright wall 21 of the right-angled shoulder S of the machined workpiece W..

With the cutting insert being mounted as above, an effective cutting corner obtained between the major cutting edge constituted by the central portion 5a and the first lateral portion 5b of the peripheral cutting edge 5, and the wiper constituted by the second lateral portion 5c of the frontal cutting edge 50, has an apparent magnitude of substantially 90° enabling thereby a proper machining of the fight-angled shoulder S. It should be mentioned with reference to FIG. 12 that the fact that, due to the specific geometry of the insert corner 6 an angle obtained in the machined shoulder is slightly greater than 90° can be disregarded in view of an extremely small, about 0.015 mm, deviation 26 of a surface machined by the portion 5b from a general direction of the upright wail 21 of the shoulder S, especially with the corner 6 of the insert being rounded.

Figure 13:
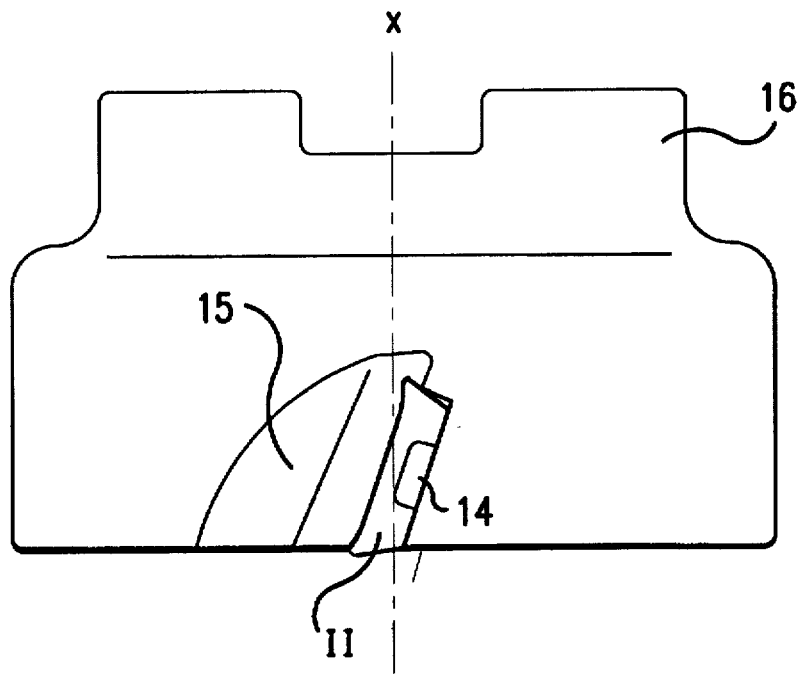
FIG. 13 is a schematic view of a milling cutter employing a cutting insert according the second embodiment thereof shown in FIGS. 1a and 7 to 9.
Figure 14:
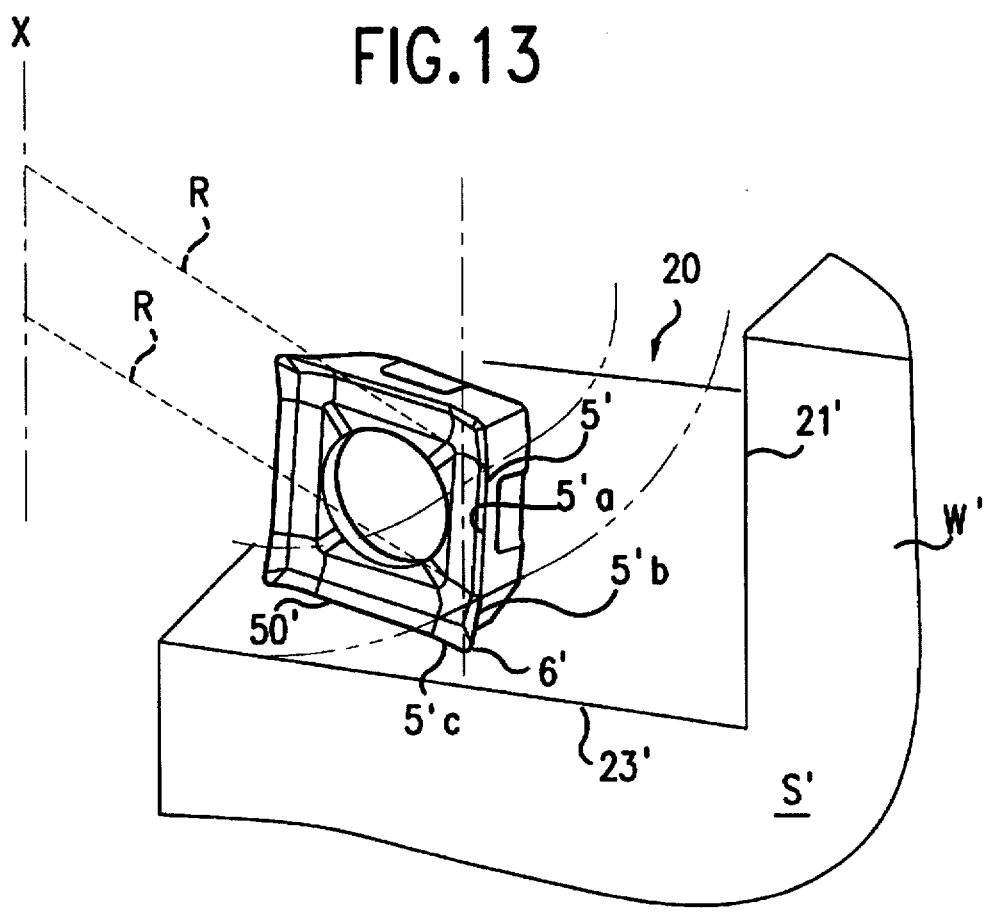
FIG. 14 is schematic perspective view of the cutting insert as shown in FIG. 13 and of a shoulder machined in a workpiece by a milling cutter using this insert.

FIGS. 13 and 14 illustrate that the manner in which the cutting insert II according to the second embodiment of the present invention is mounted in a milling cutter is identical to that of the cutting insert I of the first embodiment Thus, the central portion 5'a of the peripheral carting edge 5' and the second lateral portion 5'c of the frontal cutting edge 50' form therebetween an apparent angle of substantially 90° enabling thereby a proper machining of the right-angled shoulder S.

Thus, with cutting inserts designed according to the present invention and positioned in a milling cutter in the manner described above, there is, on the one hand, ensured an adequate end cutting clearance angle 30 between a non-active portion of the frontal cutting edge and the base wall of the machined shoulder and, on the other hand, provided that a deviation from straightness of the uprising wall of the machined shoulder does not exceed an accepted limit.

Though the preferred embodiments of the present invention is described with the insert being mounted on a right-hand cutter, it is clear that the insert can be used in a left-hand cutter, as well.

With the cutting insert according to the present invention having all cutting edges capable of use to an equal measure in right-hand as well as left-hand tools, it should, however, be clear that after the insert has once been employed in a tool of one specific type and its active cutting edge portion have been accordingly worn out, its further use is limited to the tools of this type only.

The insert according to the present invention may have features different from those described above and shown in the accompanying drawings. Thus, the insert may have other number of indexable cutting edges and cutting corners. The cutting edge portions, in particular, central portions may be specifically shaped, vary in height, be curved, e.g. convex or concave. The angle between the plane of the adjoining lateral portions of cutting edges and the insert base may have values smaller or greater than those mentioned in the preferred embodiments. The rake surface of the insert may be provided with any suitable kind of chip forming means and the side flanks may have a design different from that described in the preferred embodiment of the present invention.

We claim:

1. An exchangeable cutting insert adapted for mounting in a cutter tool body, said cutting insert being a substantially prismoidal body having a planar base and an upper surface with rake portions merging with side flanks of the insert at least at two cutting edges defining therebetween an insert corner, the insert corner having a bisector plane perpendicular to the base of the insert;

each cutting edge comprising a central portion and first and second lateral portion sloping with respect to said base of the inert, said corner being associated, with adjoining first and second lateral portions of the adjacent cutting edges;

each cutting edge being capable of operating, when the insert is mounted in the tool, as a peripheral cutting edge having a cutting length defined by the first lateral portion and the central portion thereof, and as a frontal cutting edge having a cutting length defined by the second lateral portion thereof;

characterised in that said central portions of the cutting edges define therebetween a first plane parallel to said base and said adjoining first and second lateral portions have equal lengths and define therebetween a second plane inclined with respect to said base plane and perpendicular to said bisector plane so that said insert corner and said cutting edges have a geometry of a mirror symmetry with respect to said bisector plane.

2. A cutting insert according to claim 1, wherein said cutter tool is a rotary cutting tool, said insert being adapted for mounting in the tool in such a manner that said second lateral portion of the insert front cutting edge is disposed in a plane normal to a rotary axis of the tool, thereby serving as a wiper, and said central portion of the insert peripheral cutting edge is oriented so that, during rotation of the insert around the rotary axis, it constitutes a generator which sweeps a substantially cylindrical envelope.

3. A cutting insert according to claim 1, wherein said adjoining first and second lateral portions of the cutting edges slope downwardly from said central portion of a respective cutting edge, said second plane sloping towards the insert base in the direction of the respective insert corner, when viewed from a center of the insert.

4. A cutting insert according to claim 1, wherein said adjoining first and second lateral portions of the cutting edges slope upwardly from said central portion of a respective cutting edge, said second plane sloping away from the insert base in the direction of the respective insert corner, when viewed from a center of the insert.

5. A cutting insert according to claim 1, wherein the insert has a plurality of identical insert corners each being associated with a pair of neutrally handed indexable cutting edges.

6. A cutting insert according to claim 5, wherein the insert has a basic square shape, four identical cutting edges meet at four identical insert corners, and a 90° rotational symmetry, both clockwise and counterclockwise, around a central axis of the insert.

7. A cutting insert according to claim 1, wherein said central portion merges continuously with said first and second lateral portions associated therewith.

8. An exchangeable cutting insert adapted for mounting in a cutter tool body and having a substantially prismoidal body with a planar base surface, an upper surface and side flanks;

at least two cutting edges defined at an intersection of said upper surface with respective side flanks and meeting at an insert corner having a bisector plane perpendicular to said base surface of the insert;

each cutting edge comprising a central portion and first and second lateral portions on either side of the central portion, the first and second lateral portions having equal lengths, said insert corner being associated with adjoining first and second lateral portions of the adjacent cutting edges;

said central portions of the cutting edges defining therebetween a first plane parallel to said base and said adjoining first and second lateral portions defining therebetween a second plane inclined with respect to said base plane so that a line of intersection between said first and second planes is perpendicular to said bisector plane;

each cutting edge being capable of operating as a peripheral cutting edge having a cutting length defined by the first and central portions thereof, and as a frontal cutting edge having a cutting length defined by the second lateral portion thereof, said first and second lateral portions having equal lengths.

9. A cutting insert according to claim 8, wherein said cutter tool is a rotary cutting tool, said insert being adapted for mounting in the tool in such a manner that said second lateral portion of the insert front cutting edge is disposed in a plane normal to a rotary axis of the tool, thereby serving as a wiper, and said central portion of the insert peripheral cutting edge is oriented so that, during rotation of the insert around the rotary axis, it constitutes a generator which sweeps a substantially cylindrical envelope.

10. A cutting insert according to claim 8, wherein said adjoining first and second lateral portions of the cutting edges slope downwardly from said central portion of a respective cutting edge, said second plane sloping towards the insert base in the direction of the respective insert corner, when viewed from a center of the insert.

11. A cutting insert according to claim 8, wherein said adjoining first and second lateral portions of the cutting edges slope upwardly from said central portion of a respective cutting edge, said second plane sloping away from the insert base in the direction of the respective insert corner, when viewed from a center of the insert.

12. A cutting insert according to claim 8, wherein the insert has a plurality of identical insert corners each being associated with a pair of neutrally handed indexable cutting edges.

13. A cutting insert according to claim 12, wherein the insert has a basic square shape, four identical cutting edges, adjacent cutting edges meeting at four identical insert corners, and a 90° rotational symmetry, both clockwise and counterclockwise, around a central axis of the insert.

14. A cutting insert according to claim 8, wherein said central portion merges continuously with said first and second lateral portions associated therewith.

15. A cutting insert comprising:
a substantially prismoidal body having a base surface, an upper surface, side flanks, first and second cutting edges, each cutting edge formed at an intersection between the upper surface and respective first and second side flanks, the cutting edges being adjacent to one another and defining a first insert corner therebetween, each cutting edge extending substantially along an entire length of its respective side flank between said first insert corner and an adjacent insert corner, wherein
each cutting edge comprises a central portion, and first and second lateral portions on either side of the central portion, said lateral portions sloping with respect to the central portion in a side view of the insert, the first lateral portion of the first cutting edge adjoining the second lateral portion of the second cutting edge at said first insert corner;
the central portions of the cutting edges define a first plane parallel to said insert base; and
the first insert corner has a bisector plane perpendicular to the first plane, the first lateral portion of the first cutting edge and the second lateral portion of the second cutting edge define a second plane, said second plane being inclined with respect to said first plane and perpendicular to said bisector plane.

16. The insert of claim 15, wherein the first and second cutting edges have equal lengths, and the first and second lateral portions have equal lengths and slope at an identical angle.

17. The insert of claim 16, wherein the cutting insert is fully indexable and has a basic square shape with four cutting edges and 90° rotational symmetry around a central axis of the insert.

18. The insert of claim 15, wherein the lateral portions of each cutting edge are sloped downwardly from a corresponding insert corner towards the central portion of that cutting edge.

19. The insert of claim 15, wherein the lateral portions of each cutting edge are sloped upwardly from a corresponding insert corner towards the central portion of that cutting edge.

20. A rotary cutting tool assembly comprising a tool holder having a rotary axis, and a cutting insert mounted in the tool holder,
said cutting insert comprising:
a substantially prismoidal body having a base surface, an upper surface, side flanks, first and second cutting edges, each cutting edge formed at an intersection between the upper surface and respective first and second side flanks, the cutting edges being adjacent to one another and defining a first insert corner therebetween, each cutting edge extending substantially along an entire length of its respective side flank between said first insert corner and an adjacent insert corner, wherein
each cutting edge comprises a central portion, and first and second lateral portions on either side of the central portion, said lateral portions sloping with respect to the central portion in a side view of the insert, the first lateral portion of the first cutting edge adjoining the second lateral portion of the second cutting edge at said first insert corner;
the central portions of the cutting edges define a first plane, and
the first insert corner has a bisector plane perpendicular to the first plane, the first lateral portion of the first cutting edge and the second lateral portion of the second cutting edge define a second plane, said second plane being inclined with respect to said first plane and perpendicular to said bisector plane; wherein
the first lateral portion and the central portion of the first cutting edge define a cutting length of a peripheral cutting edge, and the second lateral portion of the second cutting edge defines a cutting length of a frontal cutting edge.

21. The assembly of claim 20, wherein the second lateral portion of the second cutting edge is disposed in a plane normal to the rotary axis of the tool holder, and the central portion of the first cutting edge is oriented such that, during rotation of the insert around the rotary axis of the tool holder, it sweeps a substantially cylindrical envelope.

22. An exchangeable cutting insert adapted for mounting in a cutter tool body, said cutting insert being a substantially prismoidal body having a planar base and an upper surface with rake portions merging with side flanks of the insert, at least two cutting edges defining therebetween an insert corner, said insert corner having a bisector plane perpendicular to the base of the insert;
each cutting edge comprising a central portion and first and second lateral portions sloping with respect to said base of the insert, said insert corner being associated with adjoining first and second lateral portions of the adjacent cutting edges;
each cutting edge being capable of operating, when the insert is mounted in the tool, as a peripheral cutting edge having a cutting length defined by the first lateral portion and the central portion thereof, and as a frontal cutting edge having a cutting length defined by the second lateral portion thereof; wherein
said central portions of the cutting edges define therebetween a first plane parallel to said base,
said adjoining first and second lateral portions have equal lengths and define therebetween a second plane inclined with respect to said base plane and perpendicular to said bisector plane so that said insert corner and said cutting edges have a geometry of a mirror symmetry with respect to said bisector plane, and said adjoining first and second lateral portions of the cutting edges slope downwardly from said central portion of a respective cutting edge, said second plane sloping towards the insert base in the direction of said insert corner, when viewed from a center of the insert.

23. The insert according to claim 22, wherein said cutter tool is a rotary cutting tool, said insert being adapted for mounting in the tool in such a manner that said second lateral portion of the insert front cutting edge is disposed in a plane normal to a rotary axis of the tool, thereby serving as a wiper, and said central portion of the insert peripheral cutting edge is oriented so that, during rotation of the insert around the rotary axis, it constitutes a generator which sweeps a substantially cylindrical envelope.

24. The insert according to claim 22, wherein the insert has a plurality of identical insert corners each being associated with a pair of neutrally handed indexable cutting edges.

25. The insert according to claim 24, wherein the insert has a basic square shape, four identical cutting edges meet at four identical insert corners, and a 90° rotational symmetry, both clockwise and counterclockwise, around a central axis insert.

26. The insert according to claim 22, wherein said central portion merges continuously with said first and second lateral portions associated therewith.

27. An exchangeable cutting insert adapted for mounting in a cutter tool body, said cutting insert being a substantially prismoidal body having a planar base and an upper surface with rake portions merging with side flanks of the insert, at least two cutting edges defining therebetween an insert corner, said insert corner having a bisector plane perpendicular to the base of the insert;

each cutting edge comprising a central portion and first and second lateral portions sloping with respect to said base of the insert, said insert corner being associated with adjoining first and second lateral portions of the adjacent cutting edges;

each cutting edge being capable of operating, when the insert is mounted in the tool, as a peripheral cutting edge having a cutting length defined by the first lateral portion and the central portion thereof, and as a frontal cutting edge having a cutting length defined by the second lateral portion thereof; wherein said central portions of the cutting edges define therebetween a first plane parallel to said base, said adjoining first and second lateral portions have equal lengths and define therebetween a second plane inclined with respect to said base plane and perpendicular to said bisector plane so that said insert corner and said cutting edges have a geometry of a mirror symmetry with respect to said bisector plane, and said adjoining first and second lateral portions of the cutting edges slope upwardly from said central portion of a respective cutting edge, said second plane sloping away from the insert base in the direction of said insert corner, when viewed from a center of the insert.

28. The insert according to claim 27, wherein said cutter tool is a rotary cutting tool, said insert being adapted for mounting in the tool in such a manner that said second lateral portion of the insert front cutting edge is disposed in a plane normal to a rotary axis of the tool, thereby serving as a wiper, and said central portion of the insert peripheral cutting edge is oriented so that, during rotation of the insert around the rotary axis, it constitutes a generator which sweeps a substantially cylindrical envelope.

29. The insert according to claim 27, wherein the insert has a plurality of identical insert corners each being associated with a pair of neutrally handed indexable cutting edges.

30. The insert according to claim 29, wherein the insert has a basic square shape, four identical cutting edges meet at four identical insert corners, and a 90° rotational symmetry, both clockwise and counterclockwise, around a central axis of the insert.

31. The insert according to claim 27, wherein said central portion merges continuously with said first and second lateral portions associated therewith.

* * * * *